Figure 1:
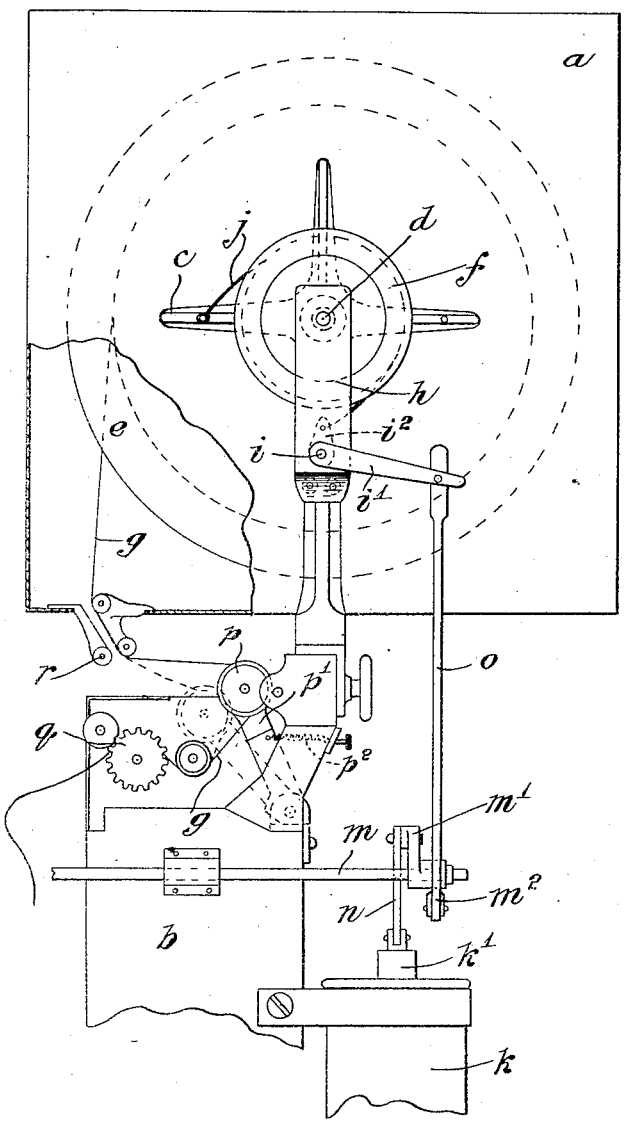

W. P. ROBERTSON.
FILM REEL BRAKE FOR CINEMATOGRAPHIC TARGETS.
APPLICATION FILED JUNE 7, 1919.

1,334,966.

Patented Mar. 30, 1920.

William P. Robertson, INVENTOR

Frank P. Wentworth, ATTORNEY.

WITNESS:

UNITED STATES PATENT OFFICE.

WILLIAM P. ROBERTSON, OF NEW YORK, N. Y., ASSIGNOR TO ANIMATED TARGET COMPANY, INC., OF NEW YORK, N. Y.

FILM-REEL BRAKE FOR CINEMATOGRAPHIC TARGETS.

1,334,966.  Specification of Letters Patent.  Patented Mar. 30, 1920.

Application filed June 7, 1919. Serial No. 302,531.

*To all whom it may concern:*

Be it known that I, WILLIAM P. ROBERTSON, a citizen of the United States, residing at the borough of Manhattan, in the city, county, and State of New York, have invented certain new and useful Improvements in Film-Reel Brakes for Cinematographic Targets, of which the following is a specification, reference being had therein to the accompanying drawings, which form a part thereof.

My invention relates to film reel brake for automatic targets, and more particularly to a device of this character adapted to act upon the upper or idler reel for preventing overrunning of this reel upon the stoppage of the projector.

In cinematographic targets of various types, one essential characteristic thereof is the stoppage of the projector substantially simultaneously with the impact of a bullet with the screen so as to convert the moving image at which fire is directed, to a still image for the purpose of permitting marking of the accuracy of the fire. A stop mechanism may be applied to the film feeding mechanism in any desired manner, the detailed mechanism for stopping the film forming no part of my present invention. In actual practice it has been observed, however, that even though the film feeding mechanism be instantly stopped, the idler film reel will overrun, thus creating slack in the film, which slack is taken up by a reverse rewinding of the film upon the reel. As a consequence, when a projector is restarted after the brief period of rest provided to permit marking, the idler reel will rotate first in one direction for a partial revolution, or a plurality of revolutions, and then reverse its direction of rotation, placing the film under sudden sharp stresses having a tendency to break it. Furthermore the creation of slack in the film and its subsequent taking up by the feeding mechanism has a tendency to mutilate the film and sometimes to entangle it and cause it to choke the valve with a resultant breakage of the film.

With these conditions in mind, I have provided a brake mechanism operative upon the idler reel of the projector forming a part of the cinematographic target apparatus, which is so constructed as to permit the free running of the reel while the projector is in operation, but which will become operative substantially simultaneously with the application of power to the film feeding mechanism for the purpose of stopping the projector, thus preventing the overrunning of the idler reel above referred to. This brake mechanism is set substantially simultaneously with the mechanism controlling the stoppage of the feed of the film, and is substantially instantaneously released to permit the restarting of the projector as determined by other mechanisms of the machine.

In projectors used in cinematographic targets, the stoppage of the projector, to permit accuracy of marking, must be so rapid that the picture exposed upon the screen at the instant of the impact of a bullet, will be brought to rest at the sight opening, or in the event of the impact of a bullet with the screen during the feeding movement of the film, the film will be stopped upon the exposure of the succeeding picture, or at most upon the second succeeding picture. Hence the interval during which the brake mechanism of my invention must become operative is a small fraction of a second, so that I have found it necessary, in order to synchronize the functioning of the brake mechanism of this invention with that of the main control for the projector, to provide an automatic take-up device for the film which is operative upon the film in a manner to prevent the formation of slack therein, or permit the creation of such slack according to the operative condition about the machine, thus compensating for any slight deviation in the adjustment of the two mechanisms.

The invention consists primarily in a film reel brake for cinematographic targets embodying therein a disk carried by, and rotatable with the spindle for the idler reel of a projector, a brake member coöperating therewith, and electrically actuated means acting upon said brake member, whereby said brake member will be set substantially simultaneously with the stoppage of the feeding mechanism of the projector; and in such other novel features of construction and combination of parts as are hereinafter set forth and described, and more particularly pointed out in the claims hereto appended.

Figure 2:
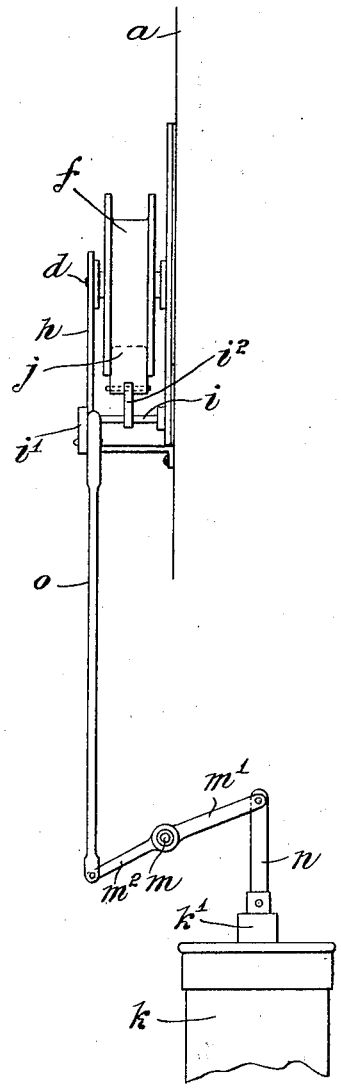

Referring to the drawings,

Figure 1 is a side view partly in elevation and partly in section of the upper portion of the lens box of the projector and the upper magazine; and Fig. 2 is a side view of the brake mechanism of my invention as applied in Fig. 1.

Like letters refer to like parts in both of said views.

In the embodiment of my invention shown in the drawings, the upper magazine is indicated at $a$, said magazine being supported from the lens box $b$ by the usual bracket $c$. Rotatably mounted in said bracket $c$ is a spindle $d$ adapted to receive a reel $e$ of film which is keyed thereto in a manner to rotate therewith.

The spindle $d$ projects beyond the bracket $c$ and has mounted thereon a disk $f$ having side flanges thereon, as shown. The film itself is indicated at $g$. The end of the spindle $d$ is supported in a bracket $h$ secured to the bracket $c$.

Mounted in the bracket $h$ and in a suitable bearing in the bracket $c$, is a crank shaft $i$ having one long crank arm $i'$ and a short crank arm $i^2$, forming a part of the actuating means for a brake member consisting of a band $j$ one end of which is secured to the bracket $c$ and the other end of which is secured to the crank arm $i^2$. This band passes about and is adapted to coöperate with the disk $f$ in a manner to develop a braking action thereon.

Supported from the lens box $b$, or in any other desired manner, is an electro-magnet $k$ preferably of the solenoid type, the core $k'$ of which is adapted to actuate the brake member $j$ by a suitable crank and link connection consisting, in the form of the invention shown, of a crank shaft $m$ one arm $m'$ of which is connected to the core $k'$ of the solenoid $k$ by means of the link $n$ and the other arm $m^2$ of which is connected with the crank arm $i'$ by the link $o$.

The solenoid $k$ is in circuit with the back plate mechanism of the target proper, so as to be energized substantially simultaneously with the actuation of the stop mechanism for the projector, which is also controlled electrically from said back plate structure. This construction being well known in the art, is not shown nor described in detail.

As heretofore stated, the working conditions of the projector forming a part of an animated target apparatus, are such that the instantaneous stoppage of the projector is not always possible, but the brake member $j$ will operate substantially instantly, or with greater rapidity than the stop mechanism of the projector in some instances. When such conditions arise, the film can be withdrawn from the reel $e$ only by overcoming the friction developed by the brake member $j$. This condition would place excessive stresses upon the film, and to avoid such stresses, I provide a take-up mechanism for the film which will permit the creation of slack in the event of the premature setting of the brake member $j$, sufficient to permit slight feeding movement of the film thereafter to take up slack in the event of a slight overrunning of the reel $e$ after the brake member $j$ has been set. This take-up member will also insure the restarting of the feeding movement of the film under identical conditions at all times.

In the form of the invention shown in the drawings, this take-up mechanism comprises a roller $p$ arranged intermediate the feeding mechanism $q$ in the lens box $b$ and the valve mechanism $r$ carried by the magazine $a$, the film passing about this take-up roller after leaving said valve. The roller $p$ is carried in a pivoted arm $p'$ upon which an adjustable spring $p^2$ acts to impart movement thereto away from the rollers of the valve $r$. This arrangement, however, may be varied with different types of projectors, it being essential, however, that the take-up mechanism be disposed between the idler reel and the feeding mechanism.

The operation of the herein described brake is substantially as follows:—

With the impact of a bullet with the back plate of the target structure, the mechanism for stopping the projector will be instantly actuated, and at the same time the circuit to the solenoid $k$ will be closed, thus energizing said solenoid and moving the core $k'$ thereof downwardly to the position shown in the drawings. With this downward movement of the core $k'$, the shaft $m$ will be rocked through the link $n$ and the crank arm $m'$, raising the link $o$ through the crank arm $m^2$. This movement will set the band $j$ upon the friction disk $f$, as a result of the oscillation of the crank $i$ through its arm $i'$, which movement is transmitted through the crank arm $i^2$ to said band.

Since the reel $e$ is merely an idler reel, the brake power required is very slight, the actuation of the solenoid $k$ through the connecting means between it and the brake member having been found to develop sufficient braking action to serve the purposes of my invention.

If stoppage of the projector and the application of braking power be simultaneous, the film will come to rest in its normal taut position between the two reels. If, on the other hand, the brake member $j$ be set a fraction of a second prior to the stoppage of the projector the spring $p^2$ will permit the arm $p'$ to move to the position shown in dotted lines, Fig. 1, thus creating slack in the film sufficient to permit a slight feeding movement thereof, say to the extent of one picture, after the member $j$ has been set.

The circuit to the solenoid $k$ is closed only momentarily, however, so that the spindle *d* will be released immediately following the application of sufficient brake power to check the moving inertia of parts, although if desired the duration of the period during which the circuit is closed may be prolonged so as to continue the braking action.

If conditions have been such that the take-up roller *p* has been moved as shown in dotted lines, Fig. 1, immediately upon the release of the brake member *j* the spring $p^2$ will become operative to restore the arm *p'* to its normal position, thus slowly rotating the reel *e* and restoring the film to a relation which it normally occupies during the feeding operation thereof.

If, on the contrary, the adjustment of parts is such that the brake member *j* is not set simultaneously with the stoppage of the projector, there might be a very slight overrunning of this reel sufficient to create very slight slackness in the film, which slackness would be taken up by the roller *p* inasmuch as the normal stresses from the film passing thereover would have a tendency to impart slight movement to the arm *p'* against the tension of the spring $p^2$. In fact with the intermittent feeding movement of the film, the arm *p'* will have a tendency to vibrate slightly with each feeding movement, which would maintain a condition where the roller *p* would be operative to take up such slack created by the slight overrunning of the reel. This overrunning of the reel could never be great, however, as it could arise only from a slight mechanical inaccuracy, or possible lost motion in the connections between the solenoid and the brake member due to wear.

It is apparent that in an electrically controlled target the energizing of the solenoid *k* could be so timed as to conform exactly with the electrical devices stopping the projector.

It is desired to point out that my invention does not in any way relate to the stoppage of the projector, but acts solely upon the idler reel in the manner heretofore described.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. A film reel brake for cinematographic targets embodying therein a disk carried by, and rotatable with the spindle for the idler reel of a projector, a brake member coöperating therewith, and electrically actuated means acting upon said brake member, whereby said brake member will be set substantially simultaneously with the stoppage of the feeding mechanism of the projector.

2. A film reel brake for cinematographic targets embodying therein a disk carried by, and rotatable with the spindle for the idler reel of a projector, a brake member coöperating therewith, an electro-magnet adapted to be energized substantially simultaneously with the stoppage of the projector, and means transmitting power from said magnet to said brake member, whereby said brake member will be set substantially simultaneously with the stoppage of the feeding mechanism of the projector.

3. A film reel brake for cinematographic targets embodying therein a disk carried by, and rotatable with the spindle for the idler reel of a projector, a band brake coöperating therewith, a crank shaft having two crank arms, one of which is connected with said band brake, an electro-magnet adapted to be energized substantially simultaneously with the stoppage of the projector, a double crank shaft, a link connecting one crank arm thereof with said magnet, and a link connecting the other crank arm thereof with the remaining crank arm of said first named shaft.

4. A film reel brake for cinematographic targets embodying therein a disk carried by, and rotatable with the spindle for the idler reel of a projector, a brake member coöperating therewith, electrically actuated means acting upon said brake member, whereby said brake member will be set substantially simultaneously with the stoppage of the feeding mechanism of the projector, and means arranged between the upper magazine and the lens box for controlling slack in the film resulting from variance in the timing of the stoppage of the projector, and in the setting of said brake member upon said disk.

5. A film reel brake for cinematographic targets embodying therein a disk carried by, and rotatable with the spindle for the idler reel of a projector, a brake member coöperating therewith, electrically actuated means acting upon said brake member, whereby said brake member will be set substantially simultaneously with the stoppage of the feeding mechanism of the projector, an oscillatory arm carried by the lens box, a spring acting thereon, and a roller carried thereby between the upper magazine and the lens box about which the film passes, whereby creation of slack in said film is permitted or prevented upon the stoppage of the projector.

6. A film reel brake for cinematographic targets embodying therein a disk carried by, and rotatable with the spindle for the idler reel of a projector, a brake member coöperating therewith, electrically actuated means acting upon said brake member, whereby said brake member will be set substantially simultaneously with the stoppage of the feeding mechanism of the projector, an oscillatory arm carried by the lens box, a spring acting thereon, means whereby the tension of said spring may be regulated, and a roller carried thereby between the upper magazine and the lens box about which the film passes, whereby creation of slack in said film is permitted or prevented upon the stoppage of the projector.

In witness whereof I have hereunto affixed my signature, this 24th day of May 1919, in the presence of two subscribing witnesses.

WILLIAM P. ROBERTSON.

Witnesses:
  DAN J. O'SULLIVAN,
  JOSEPH JOHN HOMER.